United States Patent Office 3,053,815
Patented Sept. 11, 1962

3,053,815
COPOLYMERS
John T. Barr, Westport, Conn., assignor to Pennsalt Chemicals Corporation, Philadelphia, Pa., a corporation of Pennsylvania
No Drawing. Filed Apr. 20, 1959, Ser. No. 807,335
8 Claims. (Cl. 260—78.5)

This application is a continuation-in-part of my copending application Serial No. 547,537, filed November 17, 1955. This invention relates to 2-chloro-1,1-difluorobutadiene-1,3 and to novel elastomeric compositions based on its copolymerization with unsaturated fluoroesters.

Fluorine-containing organic polymeric compositions with useful elastic properties are available commercially. However, although each of the commercially available elastomeric compositions has valuable characteristics, each also has one or more practical drawbacks, such as low tensile strength and relatively low elongation.

I have now found a new monomeric compound, 2-chloro-1,1-difluoro-butadiene-1,3, which, when copolymerized with an unsaturated fluoroester of 2,2,2-trifluoroethanol forms fluorine-containing copolymers having excellent tensile strength and superior elongation.

The compound 2-chloro-1,1-difluorobutadiene-1,3 is formed by the dehalogenation of 1-bromo-2,2-chloro-1,1-difluorobutadiene-3, e.g., with zinc dust in ethanol, to remove the bromine atom and one of the chlorine atoms. 2-chloro-1,1-difluorobutadiene-1,3 is a monomeric liquid which boils at 45–47° C. and has a refractive index $n_D^{25}$ 1.3960.

The above halogenated butene-3 compound is prepared by the method disclosed and claimed in my copending application S.N. 421,677, filed April 7, 1954. The method of its preparation is illustrated by the following equations:

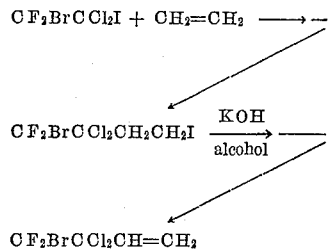

$$CF_2BrCCl_2I + CH_2=CH_2 \longrightarrow$$

$$CF_2BrCCl_2CH_2CH_2I \xrightarrow[\text{alcohol}]{KOH}$$

$$CF_2BrCCl_2CH=CH_2$$

2-chloro-1,1-difluorobutadiene-1,3 is readily polymerized to a homopolymer by use of standard polymerization procedures well known in the art, for example, emulsion polymerization in the presence of peroxide catalysts and emulsifying agents. Depending on the degree of polymerization, the homopolymer may be made with properties ranging from a viscous sticky liquid to a hard rubbery solid.

However, although 2-chloro-1,1-difluorobutadiene forms a valuable homopolymer useful in coatings for metal and wood, the monomer is especially useful as a comonomer with other fluorine-containing monomers to form highly elastic copolymers. It has now been found that such elastic copolymers are formed by copolymerizing 2-chloro-1,1-difluorobutadiene-1,3 with an unsaturated fluoroester of 2,2,2-trifluoroethanol represented by the structural $CHX=CYCOOCH_2CF_3$ in which Y is hydrogen, chlorine or fluorine, and X is hydrogen, or

—$COOCH_2CF_3$ but only hydrogen when Y is chlorine or fluorine.
The —$CH_2CF_3$ group in the structure

$CHX=CYCOOCH_2CF_3$ described above contributes to the thermal and chemical stability of the copolymers formed from 2-chloro-1,1-difluorobutadiene and the unsaturated fluoroester.

The unsaturated fluoroesters of 2,2,2-trifluoroethanol which copolymerize with 2-chloro-1,1-difluorobutadiene-1,3 according to my invention are represented by the following compounds: 2,2,2-trifluoroethyl acrylate, 2,2,2-trifluoroethyl-2-chloroacrylate, 2,2,2 - trifluoroethyl-2-fluoroacrylate, bis(2,2,2-trifluoroethyl) maleate, and bis-(2,2,2-trifluoroethyl) fumarate. The preferred ester of this invention is 2,2,2-trifluoroethyl acrylate.

The 2,2,2-trifluoroethyl acrylate, 2,2,2-trifluoroethyl-2-chloroacrylate, and 2,2,2-trifluoroethyl-2-fluoroacrylate are prepared by known methods by reacting 2,2,2-trifluoroethanol with acrylic acid, 2-chloroacrylic acid, and 2-fluoroacrylic acid, respectively.

Bis(2,2,2-trifluoroethyl) fumarate is prepared by the process disclosed and claimed in U.S. Patent No. 2,778,-850, issued January 22, 1957. Bis(2,2,2-trifluoroethyl) maleate is also prepared according to the procedure of said patent by heating a mixture of maleic acid and 2,2,2-trifluoroethanol.

Other comonomers which can be used advantageously with 2-chloro-1,1-difluorobutadiene-1,3 include many polymerizable vinyl or diene compounds. A few examples which have been found particularly advantageous are styrene, butadiene-1,3, 2,2,2-trifluoroethyl vinyl ether, and 1,1,2-trifluorobutadiene-1,3. It will be understood that this list is presented only by way of illustration.

In a preferred embodiment for preparing the copolymers of this invention, 2-chloro-1,1-difluorobutadiene-1,3 and an unsaturated fluoroester are mixed and subjected to polymerization conditions. Emulsion polymerization conditions in the presence of peroxide catalysts and emulsifying agents are preferred, but other known polymerization techniques, such as catalyzed mass, solution, or suspension polymerization, may be used.

For example, 2-chloro-1,1-difluorobutadiene-1,3 and 2,2,2-trifluoroethyl acrylate are mixed with water, an emulsifying agent and a catalyst or polymerization initiator, and the mixture is agitated in a closed reactor at ordinary or slightly elevated temperatures. The degree and rate of polymerization may advantageously be controlled by varying the amount of catalyst used and the temperature.

The proportions of 2-chloro-1,1-difluorobutadiene-1,3 and of unsaturated fluoroester used may be varied over a wide range depending on the properties desired in the copolymer. For example, useful copolymers based on as little as 5% of one monomer and 95% of the other may be prepared according to my invention, but at least 15% of 2-chloro-1,1-difluorobutadiene-1,3 is desirably used. As the amount of 2-chloro-1,1-difluorobutadiene-1,3 in the copolymer is increased, the copolymer becomes more elastic. Copolymers containing about 50% to 75% of 2-chloro-1,1-difluorobutadiene are especially preferred.

The copolymerization reaction according to my invention may be carried out over a wide range of temperature, e.g., from about 0° C. to about 125° C. Generally, however, preferred products are obtained using emulsion polymerization at temperatures between about 0° and 100° C. and preferably between 20° and 60° C.

In general the coplymers of my invention which have the most valuable properties are rubbery solids, but valuable products ranging from viscous liquids to hard solids at ordinary temperatures may also be prepared, depending on the application desired, by varying the proportions of comonomers and/or the degree of polymerization.

Rubbers prepared by curing the homopolymer or copolymers of this invention have outstanding resistance to solvents, oils, oxygen, sunlight, heat, aging and chemicals, and are particularly useful where resistance to these is necessary, as for example, in the chemical process and allied industries. Examples of especially valuable applications include gaskets, packings, flexible piping, hoses, linings, coatings, chemically resistant gloves and boots, etc.

The invention and its practice are further illustrated by the following examples, in which the parts are by weight.

*Example 1*

811 parts of $CF_2BrCCl_2CH=CH_2$ are added dropwise to 200 parts of zinc dust and 1 part of tert.-butyl catechol in 400 parts ethyl alcohol at room temperature. The reaction mass is then treated with water and the oily layer containing the product is separated. The oil is dried over $CaCl_2$. On distillation, there are recovered about 65 parts of liquid boiling at 41–45° C., 262 parts boiling at 45°–47° C. ($n_D^{25}$ 1.3960), and 90.5 parts of brown oily residue. The fraction boiling at 45°–47° C. was identified as 2-chloro-1,1-difluorobutadiene-1,3.

*Example 2*

A pressure reactor is charged with 40 parts of 2-chloro-1,1-difluoro-butadiene-1,3, 70 parts of water, 2 parts of Aerosol OT, 0.5 part of potassium persulfate, 0.25 part of sodium bisulfite, 0.25 part of borax and 0.4 part of tertiary dodecyl mercaptan and is agitated at 50° C. for about 48 hours. About 20 parts of white, rubbery crumbs of polymer are recovered. The polymer, on milling, forms a sheet which is reversibly extensible to about 300%. The sheet can be vulcanized and is then useful as a gasket material at moderately low temperatures and low working pressures.

*Example 3*

A pressure reactor is charged with 75 parts 2-chloro-1,1-difluoro-butadiene-1,3, 25 parts 2,2,2-trifluoroethyl acrylate, 144 parts water, 4 parts Dupanol WA, 0.8 part tertiary dodecyl mercaptan, 3.2 parts sodium bisulfite, 3.2 parts borax, and 3.2 parts potassium persulfate and is agitated at 5° C. for 44 hours. About 55 parts of a weak, rubbery, tacky polymer are obtained.

*Example 4*

100 parts of the copolymer of Example 3 is compounded with a standard polyamine recipe consisting of 35 parts of high abrasion furnace black, 1 part of sulfur, 1 part of paraffin, and 1 part of triethyl tetramine ("Teta") and milled on a rubber mill. The mass is then cured for 30 minutes at 310° F. at 500 p.s.i. pressure. The cured sheet has the following properties:

Tensile strength, p.s.i. _____ 2300
Percent elongation _____ 440
Shore A hardness _____ 82

Cured polymer made as above described was immersed in Esso Turbo Oil 15 at about 390° F. for 46 hours with no indication of swelling being observed.

The same cured polymer was immersed in carbon tetrachloride for 20 hours with no indication of swelling being observed.

*Example 5*

A pressure reactor is charged with 50 parts of 2-chloro-1,1-difluorobutadiene-1,3 and 50 parts of bis(2,2,2-trifluoroethyl) fumarate, 144 parts of water, 4 parts of Dupanol WA, 0.8 part tertiary dodecyl mercaptan, 3.2 parts sodium bisulfite, 3.2 parts borax and 3.2 parts potassium persulfate and is agitated at 50° C. for 18 hours. The copolymer formed is an extensible, white, waxy solid.

*Example 6*

Following the procedure of Example 5, 50 parts of 2-chloro-1,1-difluoro-butadiene-1,3 is copolymerized with 50 parts of bis(2,2,2-trifluoroethyl) maleate. The copolymer formed is an extensible white waxy solid.

*Example 7*

Following the procedure of Example 4, the copolymers of Examples 5 and 6 are compounded and then cured with a standard polyamine recipe to form high tensile strength, elastic sheets of moderate hardness. Like the copolymer of Example 4, these latter copolymers have high oil and solvent resistance.

*Example 8*

Following the same procedures used in Examples 3 and 5, 2-chloro-1,1-difluorobutadiene-1,3 can be copolymerized with 2,2,2-trifluoro-2-chloroacrylate or 2,2,2-trifluoro-2-fluoroacrylate to form copolymers having advantageous properties. These copolymers can also be vulcanized as described in Example 4.

Aerosol OT is a dioctyl ester of sodium sulfosuccinic acid. Dupanol WA has as its active ingredient sodium lauryl sulfate.

Many widely different embodiments of this invention may be made without departing from the scope and spirit thereof and it is to be understood that my invention includes all such embodiments and is not to be limited by the above description.

I claim:

1. As a new compound, 2-chloro-1,1-difluorobutadiene-1,3.
2. Homopolymer of 2-chloro-1,1-difluorobutadiene-1,3.
3. Copolymer of 2-chloro-1,1-difluorobutadiene-1,3 with an unsaturated fluoroester of 2,2,2-trifluoroethanol selected from the group consisting of 2,2,2-trifluoroethyl acrylate, bis(2,2,2-trifluoroethyl) fumarate, bis(2,2,2-trifluoroethyl) maleate, 2,2,2-trifluoroethyl-2-chloroacrylate and 2,2,2-trifluoroethyl-2-fluoroacrylate.
4. Copolymer of 2-chloro-1,1-difluorobutadiene-1,3 with 2,2,2-trifluoroethyl acrylate.
5. Copolymer of 2-chloro-1,1-difluorobutadiene-1,3 with bis(2,2,2-trifluoroethyl) maleate.
6. Copolymer of 2-chloro-1,1-difluorobutadiene-1,3 with bis(2,2,2-trifluoroethyl) fumarate.
7. Copolymer of 2-chloro-1,1-difluorobutadiene-1,3 with 2,2,2-trifluoroethyl-2-chloroacrylate.
8. Copolymer of 2-chloro-1,1-difluorobutadiene-1,3 with 2,2,2-trifluoroethyl-2-fluoroacrylate.

References Cited in the file of this patent

UNITED STATES PATENTS

| | | |
|---|---|---|
| 2,642,416 | Ahlbrecht | June 16, 1953 |
| 2,668,182 | Miller | Feb. 2, 1954 |
| 2,716,141 | Miller | Aug. 23, 1955 |
| 2,750,431 | Tarrant et al. | June 12, 1956 |
| 2,762,790 | Greene | Sept. 11, 1956 |
| 2,778,850 | Barr et al. | Jan. 22, 1957 |
| 2,917,496 | Honn et al. | Dec. 15, 1959 |

OTHER REFERENCES

Bovey et al.: Journal of Polymer Science, vol. 15–16, pages 520–536 (1955). (Copy in Scientific Library.)

Tarrant et al.: Journal American Chemistry Society, vol. 77, pages 3640–3642 (1955). (Copy in Scientific Library.)

UNITED STATES PATENT OFFICE
CERTIFICATE OF CORRECTION

Patent No. 3,053,815                                        September 11, 1962

John T. Barr

It is hereby certified that error appears in the above numbered patent requiring correction and that the said Letters Patent should read as corrected below.

Column 1, line 28, for "difluorobutadiene-3" read -- difluorobutene-3 --.

Signed and sealed this 15th day of January 1963.

(SEAL)
Attest:

ERNEST W. SWIDER
Attesting Officer

DAVID L. LADD
Commissioner of Patents